United States Patent [19]
Mann et al.

[11] Patent Number: 5,728,469
[45] Date of Patent: Mar. 17, 1998

[54] BLOCK COPOLYMER RELEASE SURFACE FOR PRESSURE SENSITIVE ADHESIVES

[75] Inventors: Roger H. Mann, Corona Del Mar; Edward I. Sun, Arcadia; Sebastian S. Plamthottam, Upland, all of Calif.; Charles W. Newing, Troy, Ohio

[73] Assignee: Avery Dennison Corporation, Pasadena, Calif.

[21] Appl. No.: 485,234

[22] Filed: Jun. 6, 1995

[51] Int. Cl.$^6$ ................................................ B32B 7/06
[52] U.S. Cl. ................ 428/418; 428/413; 428/41.4; 428/352; 428/447; 428/500; 428/516; 428/448; 525/92 G; 525/105; 525/106
[58] Field of Search ............... 428/40, 41.3, 41.8, 428/41.4, 352, 447, 448, 500, 516; 525/92 G, 100, 105, 106, 431

[56] References Cited

U.S. PATENT DOCUMENTS

| | | | |
|---|---|---|---|
| 2,532,011 | 11/1950 | Dahlquist et al. | 154/53.5 |
| 2,607,711 | 8/1952 | Hendricks | 117/122 |
| 2,876,894 | 3/1959 | Dahlquist et al. | 206/59 |
| 3,342,625 | 9/1967 | Grossman et al. | 117/68.5 |
| 3,665,052 | 5/1972 | Saam et al. | 260/827 |
| 3,691,257 | 9/1972 | Kendrick et al. | 260/827 |
| 3,726,710 | 4/1973 | Berger et al. | 117/93.31 |
| 3,865,897 | 2/1975 | Falender et al. | 260/827 |
| 4,070,526 | 1/1978 | Colquhoun et al. | 428/537 |
| 4,201,808 | 5/1980 | Cully et al. | 428/40 |
| 4,256,870 | 3/1981 | Eckberg | 528/15 |
| 4,262,107 | 4/1981 | Eckberg | 528/15 |
| 4,279,717 | 7/1981 | Eckberg et al. | 204/159.13 |
| 4,339,485 | 7/1982 | Shibano | 428/40 |
| 4,340,647 | 7/1982 | Eckberg | 428/429 |
| 4,348,454 | 9/1982 | Eckberg | 428/334 |
| 4,425,176 | 1/1984 | Shibano | 156/244.11 |
| 4,576,999 | 3/1986 | Eckberg | 525/476 |
| 4,673,611 | 6/1987 | Crass | 428/215 |
| 4,702,874 | 10/1987 | Ohara | 264/171 |
| 4,713,273 | 12/1987 | Freedman | 428/40 |
| 4,716,068 | 12/1987 | Seifried | 428/141 |
| 4,728,571 | 3/1988 | Clemens | 428/352 |
| 4,839,123 | 6/1989 | Duncan | 264/22 |
| 4,921,882 | 5/1990 | Senich | 522/99 |
| 4,925,728 | 5/1990 | Crass | 428/216 |
| 4,978,436 | 12/1990 | Kelly | 204/165 |
| 5,154,962 | 10/1992 | Mertens et al. | 428/40 |
| 5,169,900 | 12/1992 | Gudelis | 525/106 |
| 5,206,092 | 4/1993 | Araki et al. | |
| 5,213,743 | 5/1993 | Ohara | 264/171 |
| 5,229,179 | 7/1993 | Kumar | 428/40 |
| 5,290,615 | 3/1994 | Tushaus | 428/40 |
| 5,454,962 | 10/1995 | Martens et al. | 525/106 |

FOREIGN PATENT DOCUMENTS

| | | |
|---|---|---|
| 021041 | 1/1987 | European Pat. Off. |
| 334051 | 9/1989 | European Pat. Off. |
| 413457 | 2/1991 | European Pat. Off. |
| 0484093A2 | 5/1992 | European Pat. Off. |
| 60-112442 | 6/1985 | Japan |
| 63-145386 | 6/1988 | Japan |
| 1168996 | 7/1989 | Japan |
| 3229776 | 10/1991 | Japan |
| 4085022 | 3/1992 | Japan |
| 6041500 | 2/1994 | Japan |
| 1376446 | 12/1974 | United Kingdom |
| 9634029 | 10/1996 | WIPO |

OTHER PUBLICATIONS

Saam, John C. et al., "Block Copolymers of Polydimethylsiloxane and Polystyrene," *Macromolecules*, vol. 3, No. 1, pp. 1–4 (1970).

Yuya Yamashita et al., "Surface Modification of Polymethyl Methacrylate by Graft Copolymers," *Polymer Bulletin* 7, pp. 289–294 (1982).

Patent Publication No. J 63101428–A, Showa Denko KK, Modified Polyolefin Production by Reacting Polysiloxane having Polar Function GP with Polyolefin having Polar Functional GP, Published May 6, 1988, Abstract Only.

Patent Publication No. JP 05032830–A, Flame Resistant Polyolefin Resin Composition for Moulded Part Consisting of Polyolefin Mixture Contg. Magnesium Hydroxide, Hydrogenated Styrene–Butadiene Block Copolymer and Polyolefin Modified Polysiloxane, Published Feb. 9, 1993, Abstract Only.

Patent Publication No. EP555197–A, Antistatic Agent for Thermoplastic Polymers—Yields Compositions with Acceptable Balance of Mechanical Properties and High Level of Static Charge Decay, Published Nov. 22, 1993, Abstract Only.

Patent Publication No. GB1376446–A, Organopolysiloxane–Alkylene Block Copolymers Prepared by Hydrogenation Gives Copolymers Useful as Additives in Organo Polymers e.g. polyolefins, Published Aug. 31, 1993, Abstract Only.

Patent Publication No. JP 49000344–A, Thermoplastic Elastomer Compositions Contg. Diene Polymer Block–Monovinyl Arom Hydrocarbon Polymer, Polyethylene and Silicone Oil, Published Aug. 31, 1993, Abstract Only.

Patent Publication No. WO 8804237–A, Polyethylene Terephthalate Polyterephthalate Pet Polystyrene Polypropylene Polyacrylonitrile Polycarbonate PVDC Polyvinylidene Chloride, Published Dec. 20, 1993, Abstract Only.

Patent Publication No. JP 63101428–A, Modified Polyolefin Production by Reacting Polysiloxane Having Polar Function GP, with Polyolefin Have Polar Functional GP, Published Sep. 23, 1993, Abstract Only.

(List continued on next page.)

*Primary Examiner*—Ralph H. Dean
*Attorney, Agent, or Firm*—Christie, Parker & Hale, LLP

[57] ABSTRACT

Release surfaces comprising extruded polymer-siloxane block copolymer mixtures are provided. At least one block of the copolymer is a polymer compatible with the bulk polymeric material, while a second block is polysiloxane. Coextruded release surfaces comprising two or more polymeric layers, including one layer of a polymer-siloxane block copolymer mixture, are provided. The release surfaces serve as release liners for pressure sensitive adhesive labels and tapes.

39 Claims, No Drawings

OTHER PUBLICATIONS

Patent Publication No. EP 386962-A, Producing Ultra-thin, Self-assembling Mol. Film by Delivering Amphiliphilic Mols. to Aq. liq. Surface as Film-forming Soln., Published Sep. 28, 1993, Abstract Only.

Patent Publication No. EP 380428-A, Non Adhesive Particles Preparation by Crosslinkingro Propionate Preparation of Organo Polysiloxane Composition in Elastomer by Polyaddition Reactions, Published Sep. 28, 1993, Abstract Only.

Patent Publication No. US 5,190,879-A, Controlled Atmosphere Organisms Container with Passive Containment Barriers Has Vent with Thin Gas-Permeable Membrane of Poly Dimethyl Siloxane on Porous Support Sheet, Published Nov. 12 1993, Abstract Only.

Patent Publication No. JP 05032830-A, Flame Resistant Polyolefin Resin Composition for Moulded Pt Consists of Polyolefin Mixture Contg. Magnesium Hydroxide, Hydrogenated Styrene-Butadiene Block Copolymer and Polyolefin-modified Polysiloxane, Published Nov. 22, 1993, Abstract Only.

Patent Publication No. US 5240899-A, Contg. Polysiloxane Deriv. in Polyvinyl Acetal Binder for Reduced Friction Debris, Scratching and Corrosion, Published Nov. 22, 1993, Abstract Only.

Patent Publication No. JP 05194820-A, Styrene Type Thermoplastic Elastomer Composition and its Mouldings, includes Units of Polyolefin-Modified Polysiloxane and Organic Peroxide, Published Nov. 22, 1993 Abstract Only.

Publication: Institute of Polymer Science, Amphiphilic Networks. V. Polar/nonpolar Surface Characteristics, Protein Adsorption from Human Plasma and Cell Adhesion, Published 1992, Abstract Only.

Publication: Makromol Chemical, Synthesis of a Poly(dimethylsiloxane) Macromonomer and its *Copolymerization* with Ethylene, Published 1989, Abstract Only.

Publication: J. Appl. Polymer Science, In Situ Compatibilization of Low-Density *Polyethylene* and *Polydimethylsiloxane* rubber blends using ethylene-methyl acrylate *Copolymer* as a chemical compatibilizer, Published 1993, Abstract Only.

Publication: J. Biomedical Mater. Res., Functional Versus quantitative Comparison of IL-1, Beta from Monocytes/Macrophages on Biomedical Polymers, Published 1993, Abstract Only.

Journal Publication 90-247176, Title Only No Abstract Production of Alpha-Olefin-Hydrocarbon-Organo-Silicon Grafted Polymer- by First Producing Macromolecular Organo-Siloxane Monomer and Copolymerising it with Alpha-Olefin.

Sterzynski, et al., "Structure and Properties of Nucleated Random and Block Copolymers of Propylene", Advances in Polymer Technology, vol. 13, No. 1, 25-36 (1994).

BLOCK COPOLYMER RELEASE SURFACE FOR PRESSURE SENSITIVE ADHESIVES

The present invention relates to release surfaces for pressure sensitive adhesive constructions such as labels, tapes, signs and decals, and more particularly, to extruded polymeric film release surfaces having siloxane block copolymer components.

BACKGROUND OF THE INVENTION

Labels, tapes, signs, decals and other adhesive constructions are ubiquitous in modern society. Both glue applied and pressure sensitive adhesive constructions are known. For labels and similar products, a typical construction consists of a paper or film face stock backed by a layer of pressure sensitive adhesive, which is covered by a release liner that protects the adhesive during shipment, storage, and handling. Pressure sensitive adhesive tapes have a similar construction, but the release surface is often placed on the opposite face of the face stock, thus allowing the entire tape to be rolled up on itself and dispensed without spoiling the construction: Sometimes an interliner having a release surface is included as part of the tape construction.

Although some polymeric films having a low shearing modulus have been found to be useful as release liners without the use of a release coating (see, for example, U.S. Pat. Nos. 4,339,485 and 4,425,676), in general, the release surface of a pressure sensitive adhesive construction comprises a release coating on a flexible backing. A wide variety of flexible backing substrates are used. Generally, paper dominates because it is the least expensive sheet material having the required bulk and stiffness. Polyethylene coated paper is also widely used. In recent years, however, release coated polymeric films have become more important as release liners, including polyester, polyethylene, and polypropylene films. Such films do not tear as easily as paper liners, and are often more suitable for high speed label application rates. Additionally, polymeric film release liners often have a smoother release surface than paper liners and are better suited for certain labeling applications where initial tack of the pressure sensitive adhesive and clarity (as in the case of a transparent label) are important.

A wide variety of release materials for pressure sensitive tapes and labels are known, including silicones, alkyds, stearyl derivatives of vinyl polymers (such as polyvinyl stearyl carbamate), stearate chromic chloride, stearamides and the like. Fluorocarbon polymer coated release liners are also known but are expensive. For pressure sensitive labels, silicones are by far the most frequently used materials. Silicone release coatings have easy release at both high and low peel rates, making them suitable for a variety of label and tape production methods and applications.

Known silicone release coating systems consist of a reactive silicone polymer, e.g., an organopolysiloxane (often referred to as a "polysiloxane," or simply, "siloxane"); a cross-linker; and a catalyst. After being applied to the liner substrate (or tape backside), the coating generally must be cured to cross-link the silicone polymer chains, either thermally or radiatively (by, e.g., ultraviolet or electron beam irradiation).

Based on the manner in which they are applied, three basic types of silicone release coatings used in the pressure sensitive adhesive industry are known: solventborne, waterborne emulsions, and solvent free coatings. Each type has advantages and disadvantages. Solventborne silicone release coatings have been used extensively but, because they employ a hydrocarbon solvent, their use in recent years has tapered off due to increasingly strict air pollution regulations, high energy requirements, and high cost. Indeed, the energy requirements of solvent recovery or incineration generally exceed that of the coating operation itself.

Waterborne silicone emulsion release systems are as old as solvent systems, and have been used on a variety of pressure sensitive products, including tapes, floor tiles, and vinyl wall coverings. Their use has been limited, however, by problems associated with applying them to paper substrates. Water swells paper fibers, destroying the dimensional stability of the release liner backing and causing sheet curling and subsequent processing difficulties.

Solventless silicone release coatings have grown in recent years and now represent a major segment of the silicone release coating market. Like other silicone coatings, they must be cured after being applied to the flexible liner substrate. Curing produces a cross-linked film that resists penetration by the pressure sensitive adhesive.

The following patents are illustrative of various known types of silicone release coatings and release liners prepared therefrom:

U.S. Pat. No. 4,839,123 describes a process for applying a silicone release coating to an oriented polymer film, comprising the steps of applying a solventless, curable silicone release composition to an extrudable orientable polymer; extruding the polymer as a sheet or film; orienting the extruded materials such that the silicone release composition migrates to at least one surface of the sheet or film; and curing the silicone release composition to form a substantially continuous release layer on the oriented sheet or film. The patent identifies several U.S. patents that disclose solventless, curable silicone release compositions.

U.S. Pat. No. 5,229,179 describes silicone release coating compositions comprising iniferter prepared vinyl-siloxane block copolymers and blends with other polymers. The release coatings are coated on solid or flexible substrates and used to prepare release liners and adhesive tape backsides. The compositions are applied by conventional means, and at least some of the coatings can be applied as waterborne dispersions.

U.S. Pat. No. 5,290,615 describes release coatings made of polydimethylsiloxane-urea block copolymers. The coatings are applied as solventborne systems using toluene/isopropanol as the solvent.

U.S. Pat. No. 4,728,571 describes silicone release coating compositions comprising graft copolymers having a vinyl polymeric backbone and monovalent siloxane polymeric moieties grafted thereto. In a preferred method of preparation, the release compositions are coated directly from the polymerization solvent, and do not require curing or crosslinking. Sheet materials coated with the compositions, and pressure sensitive adhesive coated tapes having backsides coated with the release compositions, are also described.

U.S. Pat. No. 5,169,900 describes extruded polyolefin release coatings and films formed by grafting a vinyl silane onto a polyolefin. The release sheets are formed by extruding a mixture of polyolefin, a dimethylpolysiloxane having functional end-groups, an organoperoxide agent, a vinyl silane, and a curing agent, at a temperature exceeding the melting point of the polyolefin, such that the vinyl silane is grafted onto the polyolefin. The extruded composition is then exposed to moisture to cross-link the vinyl silane compounds.

U.S. Pat. No. 5,213,743 describes a release agent comprising a polysiloxane-olefin graft copolymer in which olefin side chains are grafted onto a polysiloxane backbone, and a method of manufacturing release paper consisting of extruding a mixture of a polyolefin resin and a graft polymer onto a paper substrate to form a laminate, where the graft polymer is as described above; and heating the laminate to cause the graft polymer in the extruded mixture to bleed onto and become localized at the surface of the mixture.

Most known silicone release systems are applied as coatings, by a variety of techniques, including direct and offset gravure, wire-wound rod, transfer roll, reverse roll, air-knife, flexographic, and other methods. Many physical considerations must be taken into account when producing a release liner with such systems, including coating viscosity, coat weight, etc. Necessarily, the apparatus and time required for applying the silicone release coating adds to the cost of the final product. Additionally, most known silicone release systems must be cured (cross-linked) after they applied, to prevent migration into (or by) the adhered pressure sensitive adhesive. Inherently, there are costs and time requirements associated with the curing process.

Although the patents discussed above have, to a limited extent, addressed some of these considerations, a need exists for an improved silicone release liner that is not applied as a coating and does not have to be cured. The present invention addresses that need.

SUMMARY OF THE INVENTION

The present invention provides a silicone release surface for pressure sensitive adhesive constructions that replaces the backing and release coating construction traditionally used for release liners. A method for making such a release surface is also provided.

In one aspect of the invention, a novel pressure sensitive adhesive release surface is prepared by extruding a mixture of a first polymeric material and a siloxane block copolymer, thereby forming an inherently releasable extruded film that is well suited for use as a label release liner, low adhesion tape backside, etc. In another aspect of the invention, the release surface comprises a coextruded sheet or film having a first layer of a mixture of a first polymeric material and a siloxane block copolymer, and one or more additional coextruded layers of polymeric material. The invention also provides tapes and labels made with the novel release surfaces disclosed herein.

DETAILED DESCRIPTION

In accordance with the present invention, a novel release surface in the form of an extruded film or sheet, or coextruded film and paper laminate, is provided. The member can be a release liner for a pressure sensitive adhesive label construction, a low adhesion surface for the backside of a self-wound pressure sensitive adhesive tape, a release interliner for a pressure sensitive adhesive tape, or any other type of article of manufacture that functions as a release surface.

In one embodiment of the invention, the release surface is a single layer extruded sheet or film of a mixture of at least two components: a bulk polymeric material and a siloxane block copolymer.

A representative, but non-exclusive, list of polymers suitable for use as the bulk polymeric material includes polyolefins, olefin copolymers (defined herein as copolymers of an olefin and one or more other monomers, for example, ethylene vinyl acetate copolymer; but excluding olefin-olefin copolymers, such as ethylene-propylene copolymer, which are classified herein as polyolefins), polyesters, nylons, and styrene polymers (such as polystyrene, poly($\alpha$-methylstyrene), styrene-butadiene copolymers, benzene ring-substituted styrene polymers and the like).

Preferred polyolefins include polyethylene, polybutene (e.g., poly(1-butene)), polypropylene, polymethylpentene, copolymers of ethylene and one or more other olefins (e.g., propylene, butene, hexene, octene, etc.), other olefin-olefin copolymers, and blends thereof. For some acrylic pressure sensitive adhesives, it can be desirable to use low modulus materials, such as described in U.S. Pat. Nos. 4,339,485 and 4,425,176, as the bulk polymeric material.

The siloxane block copolymer has two or more different polymeric blocks, end-to-end bound to one another, with at least one of the blocks being a polysiloxane. Block geometry generally is linear, and includes di-block (AB), tri-block (ABA), and similar block formulas. Non-linear, star-block copolymers (formula $(AB)_x$, where x is 3 or more) are also included, but graft copolymers are not. As used herein, a "graft copolymer" has a backbone of a first polymeric material, with multiple pendant chains of one or more different polymeric materials attached thereto.

Other monomers can be included in the block copolymer to control release values, improve printability, and/or to impart other desirable properties to the finished product.

In one embodiment of the invention, the siloxane block copolymer is a di-block copolymer (formula AB), comprised of two polymeric blocks, bound end-to-end. The first block is a polymer compatible with the bulk polymeric material that makes up the aforementioned first component of the extruded mixture. For example, if the bulk polymeric material is a polyolefin, the first block of the siloxane block copolymer comprises a polymer that is compatible with the polyolefin. As used herein, two polymeric materials are "compatible" if they are capable of existing in close and permanent physical association without exhibiting gross symptoms of polymer segregation on a macroscopic level.

The second block of the siloxane block copolymer is a polysiloxane, a single repeat unit of which has the formula:

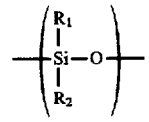

where $R_1$ and $R_2$ are independently lower alkyl (e.g., alkyl groups having from one to about three carbon atoms), fluoroalkyl (e.g., fluoroalkyl groups having from one to about three carbon atoms), or aryl (e.g., phenyl or substituted phenyl). A preferred polysiloxane block is polydimethylsiloxane (PDMS).

Thus, as one example of this embodiment of the invention, the release surface comprises an extruded mixture of (a) polyethylene and (b) a siloxane block copolymer of formula AB, where A is polyethylene and B is PDMS.

In a second embodiment of the invention, the siloxane block copolymer is a tri-block copolymer comprised of three polymeric blocks bound end-to-end. The middle block is a polysiloxane as described above. Each of the two end blocks is a polymer compatible with the aforementioned bulk polymeric material. For example, if the bulk polymeric material is polyethylene, each of the two end blocks are polymers that are compatible with polyethylene. If the two end blocks are the same, the tri-block copolymer has an ABA structure. If the end blocks are different, the copolymer has an ABC formula.

In one example of this embodiment, the release surface comprises an extruded mixture of (a) polyethylene and (b) a tri-block siloxane copolymer of formula ABA, where A is polyethylene and B is PDMS.

It will be appreciated that the non-siloxane block(s) of the block copolymer need not be identical to the first polymeric material to be compatible therewith. For example, it is known that polypropylene and poly(1-butene) are compatible polymers. Thus, conceptually, a release surface could be prepared in accordance with this invention by extruding a mixture of (a) polypropylene and (b) a poly (1-butene)-PDMS block copolymer. Other compatible materials suitable for use in the present invention will be apparent to persons skilled in this field of technology.

The siloxane block copolymers used in the practice of the present invention are prepared by anionic polymerization. Thus, di-block siloxane copolymers are conveniently prepared by first polymerizing a monomer compatible with the bulk polymeric material, using a polymerization initiator (described below), followed by addition of "$D_3$" (hexamethyl cyclotrisiloxane). Tri-block siloxane copolymers are conveniently prepared by coupling two living di-block siloxane copolymers using a difunctional coupling agent. For example, a polyethylene-polydimethylsiloxane-polyethylene (PE-PDMS-PE) block copolymer is conveniently prepared by coupling two PE-PDMS di-block copolymers using dichlorodimethylsilane as the coupling agent. Other block geometries can be prepared using multifunctional coupling agents, such as, for example, bis (trichlorosilyl)ethane.

In general, when solution anionic techniques are used, polymers of anionically polymerizable monomers are prepared by contacting the monomer to be polymerized simultaneously or sequentially with an anionic polymerization initiator such as a Group IA metal or an alkyl, amide, silanolate, naphthalide, biphenyl or anthracenyl derivative thereof. It is preferable to use an organo alkali metal compound in a suitable solvent at a temperature within the range from −150° C. to 300° C., preferably at a temperature within the range from 0° C. to 100° C. Particularly effective anionic polymerization initiators are organolithium compounds having the general formula: $RLi_n$ wherein R is an aliphatic, cycloaliphatic, aromatic or alkyl-substituted aromatic hydrocarbon radical having from 1 to 20 carbon atoms; and n is an integer of 1–4.

In general, any of the solvents known in the prior art to be useful in the preparation of such polymers may be used. Thus, suitable solvents include straight- and branched-chain hydrocarbons such as pentane, hexane, heptane, octane and the like, as well as alkyl-substituted derivatives thereof; cycloaliphatic hydrocarbons such as cyclopentane, cyclohexane, cycloheptane and the like, as well as alkyl- and aromatic-substituted derivatives thereof; aromatic- and alkyl-substituted aromatic hydrocarbons such as benzene, napthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like.

Ethylene can be polymerized as described above with the addition that it is usually best to include a promoter, such as a diamine, to facilitate the reaction. Examples of suitable diamines include but are not limited to:

N,N,N',N'-tetramethylmethylenediamine (TMMDA),
N,N,N',N'-tetramethylethylenediamine (TMEDA),
N,N,N',N'-tetraethylethylenediamine (TEEDA),
N,N,N',N'-tetramethyl-1,3-propanediamine (TMPDA),
N,N,N',N'-tetramethyl-1,4-butanediamine (TMBDA),
dipiperidinomethane (DIPIM),
1,2-dipiperidinoethane (DIPIE),
1,8-bis(dimethylamino)naphthalene,
N,N,N',N'-tetramethyl-o-phenylenediamine (TMOPDA),
1,2-dipyrolidinoethane (DIPYE),
1,3-dipiperidinopropane (DIPIP),
1,2-bis(2,6-dimethylpiperidino)-cyclohexane (BDMPC), sparteine, and the like.

When the polymerization of the ethylene is complete, living polyethylene blocks are present in the polymerization mixture. Although not bound by theory, these are believed to be perfectly linear polyethylene-alkyllithiums. These living polyethylenes are then reacted with cyclic siloxane monomers $(R_1R_2SiO)_m$, where, for example, m=3–10, $R_1$ and $R_2$=alkyl ($C_1$–$C_{20}$), alkenyl ($C_2$–$C_{20}$), H, benzyl or phenyl (including alkyl-substituted aromatics and polycyclics), and $R_1$ and $R_2$ can be the same or different. Mixtures of monomers can also be used. Preferably, the monomer is hexamethylcyclotrisiloxane ($D_3$).

Polymerization of the siloxane monomers is carried out in the presence of a polar promoter, such as, for example, the promoter present during the ethylene polymerization step. Additional promoter can be added. Suitable promoters include but are not limited to diethers, such as diglyme; diamines, such as TMEDA; cyclic ethers, such as tetrahydrofuran; and any promoter known to be useful in anionic polymerizations. The promoter serves the purpose of decreasing the reaction time of the $D_3$ polymerization.

Preferably, this reaction is carried out at a temperature of from 30° C. to 120° C., the concentration of hexamethyltrisiloxane is from 1 to 80% by weight, and the amount of promoter used ranges from 100 ppm to essentially 100% by weight (i.e., the polar promoter can be used as the solvent). The temperature range is important because higher temperatures cause more rapid reaction. The promoter concentration range is important for the same reason.

The living block copolymer can be terminated in several ways. It can be recovered directly to give PE-PDMS-OLi. It can be capped with $R_3SiCl$, e.g., to give PE-PDMS-$SiR_3$, where R can be alkyl, vinyl, phenyl, H, or the like. It can be protonated with, e.g., acetic acid, to give PE-PDMS-OH. Or, it can be coupled with, e.g., $SiCl_4$, $Me_2SiCl_2$, or $HSi(OMe)_3$, with coupling agent functionalities from 2 to about 12 to give $(PE-PDMS)_m$, where m=the number of coupling agent functionalities. The coupling or capping reaction can be carried out from 40°–100° C. for 5 minutes to 1 hour, preferably 70°–100° C. for about 10–15 minutes.

An important aspect of the above-described anionic polymerization technique relates to the characteristics of the polymerization kinetics and thermodynamics of cyclic siloxane monomers. With many well known anionically polymerizable monomers, such as 1,3-dienes, styrene, methacrylate esters, etc., the reactions are extremely fast and extremely exothermic in the presence of organolithium/diamine initiator systems, such as the PE-Li/diamine system. This can lead to "cross-over" problems for the second monomer with the precipitated PE-Li chain ends. If the kinetics of polymerization are too fast, all the second monomer may be consumed by the first fraction of PE-Li chains to react (and solubilize), thus leaving unreacted those precipitated chains which were inaccessible to the second monomer over the time frame of the second monomer polymerization step. This will result in missed molecular weight targets, broad molecular weight distributions (MWD), and contamination with substantial amounts of unreacted homo-PE. Uncontrollable exotherms may also be a problem with monomers which have a large heat of reaction.

In contrast, cyclic siloxane monomers have moderate polymerization kinetics compared to the above-mentioned monomers, and very low heats of reaction since they polymerize through ring-opening reactions (no net new bonds are created). The result is that reaction heat can be controlled easily and all the precipitated PE-Li chain ends appear to have sufficient time to participate in the $D_3$ polymerization step well before all the $D_3$ monomer is consumed. Thus, homo-PE contamination is minimized in the finished siloxane block copolymers.

In general, the siloxane block copolymers used in the practice of this invention have an overall molecular weight (MW) of from about 1,500 to about 100,000, preferably from about 2,000 to about 20,000 and, most preferably, from about 2,000 to about 10,000. In the case of PE-PDMS block copolymers, the polyethylene blocks have MW's of from about 700 to about 15,000 and, most preferably, from about 1,000 to about 6,000. The MW's of the PDMS blocks vary from about 500 to about 100,000, preferably from about 1,000 to about 20,000 and, most preferably, from about 1,000 to about 10,000.

To form the release surfaces of the present invention, a minor amount of siloxane block copolymer is extruded with a major amount of a bulk polymeric material. It will be appreciated that if the concentration of siloxane block copolymer in the finished, extruded release film is too low, the extruded film does not exhibit sufficiently low release values to be useful as a release surface. If the concentration is too high, the cost of the release surface increases, there is a risk of silicone transfer to the adhesive and, potentially, a negative effect on adhesive performance. In general, the first polymeric material comprises the bulk of the extruded mixture, with the block copolymer present in an amount ranging from about 0.1 to about 10% by weight, preferably from about 0.5 to about 3% by weight, based on the combined weight of first polymeric material and the block copolymer. In practice, the relative weight percentages of bulk polymeric material and block copolymer are measured prior to extrusion.

It will also be appreciated that the amount of siloxane block copolymer required for a particular release value depends, at least in part, on the molecular weight of the siloxane block of the copolymer. Using anionic polymerization techniques, the molecular weight of the siloxane block can be carefully controlled, and the amount of release provided by the extruded films of the present invention can be tailored to particular adhesives and applications.

A film or sheet prepared in the manner discussed above provides an inherently releasable surface for pressure sensitive adhesives. Advantageously, the film does not need to be cured to function. Although not bound by theory, it is believed that the non-siloxane block(s) of the copolymer serve to anchor the copolymer into the polymeric matrix comprised of the first polymeric component of the extruded mixture. The siloxane block is believed to "bloom" to the surface of the surrounding polymeric matrix, thereby forming a layer of low adhesion silicone moieties. The result is an inherently releasable extruded film that can function as the release liner for a label, a low adhesion backside for a pressure sensitive adhesive tape, or some other release surface, without being cured.

In another embodiment of the invention, the release surface comprises a film or sheet having a first extruded layer comprised of the above-described mixture of bulk polymeric material plus siloxane block copolymer, and one or more additional coextruded layers of polymeric material which impart, for example, strength, heat resistance, reduced friction, other physical properties, and/or simply thickness to the release surface. A non-limiting list of polymeric materials that can be coextruded with the above-described mixture of first polymeric material and siloxane block copolymer includes polyolefins, olefin copolymers, polyesters, nylons, styrene polymers, acrylonitrile butadiene rubbers, and blends thereof.

Both single layer and multilayer films are prepared in a conventional manner using, e.g., blown-film, cast-film, or similar techniques. In one embodiment of the invention, an inherently releasable, single layer, extruded film or sheet is made by extruding a mixture of a first polymeric material and a siloxane block copolymer through an extrusion die. A multilayer coextruded film is prepared by, e.g., simultaneously extruding a plurality of thermoplastic charges, one of which comprises the aforementioned mixture of a first polymeric material and a siloxane block copolymer as described above. Any suitable known type of coextrusion die can be used, including, for example, a Cloeren "vane" die used to form multilayer films for food packaging and other applications. Upon coextrusion through the die, the charges form a multilayer extrudate, an outer layer of which has release properties because of the siloxane block copolymer contained therein.

In some applications of the invention, the extrudate is hot-stretched in a known manner to provide machine direction orientation (MDO) of the film. A useful example of such hot-stretching is found in U.S. Pat. No. 4,713,273, which is incorporated herein by this reference. In other applications, it can be useful to biaxially orient the extrudate, in a conventional manner (i.e., a two-step process: (i) MDO, (ii) lateral stretch; or a blow film process). Stretching the extrudate can improve mechanical properties of the release surface, including modulus and strength, and allows a greater area of film to be produced from a given quantity of polymeric material.

It is also advantageous in some embodiments of the invention to include one or more fillers in the single and/or multilayer extruded films described above. For example, fillers such as $CaCO_3$, mica, talc, $TiO_2$, and the like can be used to impart opacity, heat resistance, and/or other desirable properties to the release surface. The incorporation of various fillers in extruded films is well described in U.S. Pat. No. 4,713,273.

To increase the crystallinity of the extruded and coextruded films described herein, it is also useful to include a nucleation agent within the pre-extruded charge(s) of polymeric materials, in order to help the non-siloxane block(s) of the siloxane block copolymer to co-crystallize more completely with the bulk polymeric material. Such nucleation agents include, but are not limited to, DBS (1,3,2,4-dibenzylidene sorbitol), MDBS (1,3,2,4-di-p-methylbenzylidene sorbitol), NaBz (a sodium salt of benzoic acid), and other agents described and/or mentioned in the article "Structure and Properties of Nucleated Random and Block Copolymers of Propylene," *Advances in Polymer Technology*, Vol. 13, No. 1, 25–36 (1974) (authored by T. Sterzynski, et al.), which is incorporated herein by this reference. Although not bound by theory, it is believed that more complete co-crystallization of the non-siloxane block (s) of the copolymer with the bulk polymeric material results in a release surface that exhibits less silicone transfer to the pressure sensitive adhesive when adhered thereto.

In an alternate embodiment of the invention, the release surface comprises an extruded film and paper laminate, sometimes referred to an extrusion coated paper liner. More particularly, a single layer or multilayer extruded film as described above is extruded directly onto a web of paper or other flexible substrate as the latter is unwound from a roll of stock. The dual ply or multi-ply release surface can be heated under pressure, and/or otherwise laminated together, using methods well known in the industry.

The release numbers described above can be directly coated with a pressure sensitive adhesive in a conventional manner, for subsequent transfer of the adhesive to a label or tape face stock. When the face stock is combined with the release surface, the adhesive is joined to the face stock. Later, the release surface is removed to expose the adhesive, which now remains permanently joined to the face stock. Alternatively, the release surfaces prepared in accordance with the present invention can be applied to a pressure sensitive adhesive-coated face stock to produce a desired construction, such as a label, sign, decal, etc.

In another embodiment, a release surface prepared in accordance with the present invention is extrusion laminated onto a face stock in a single coextrusion process. In still another embodiment, a whole label is made in one coextrusion process by simultaneously coextruding at least three charges of material: a first charge comprising at least a mixture of a first polymeric material and a siloxane block copolymer as described above; a second charge comprising a pressure sensitive adhesive; and a third charge comprises a polymeric material that functions as the face stock of the resulting label. The three charges are simultaneously extruded through a coextrusion die, thereby forming a multilayer laminate, the middle layer of which is a pressure sensitive adhesive. The laminate can then be processed (i.e., printed, die-cut, etc.) in a conventional manner, and dispensed in sheet or roll form.

The following examples provide non-limiting illustrations of the invention. In each case, a single- or multilayer film was extruded, and its release properties were measured against both a solvent acrylic adhesive (Avery Dennison "I-679") and a rubber hot melt adhesive (Avery Dennison "S-246"), using a Tag and Label Manufacturers Institute (TLMI) 90° peel test. The release surface in Example 3 also was tested against an emulsion acrylic adhesive (Avery Dennison "AT-1"). For each extruded film and each adhesive, five separate peel measurements were taken, using identical samples. In some cases (noted below), release values were measured at different peel speeds. The effect of aging on release properties was also tested for some samples.

EXAMPLE 1

One percent by weight of Shell Chemical Company Low Surface Energy Polymer #2, a di-block siloxane copolymer having a polyethylene block with a number average molecular weight of about 1300 and a PDMS block with a number average molecular weight of about 1500, was mixed with 99% by weight of low density polyethylene (Rexene 1017), using a Brabender Prep mixer with Banbary type mixing blades rotating at 10 rpm for 10 minutes, at 160° C. The mixture was granulated and then added to the hopper of a Killion single-screw extruder having a 1 in. screw diameter and 25:1 length to diameter ratio. The mixture was extruded as a single-layer film, using a Killion ABC feedblock and an Extrusion Die Incorporated (EDI) 6 in. sheet and film die. The temperature of the feedblock and die was set at 450° F. A plain, low density polyethylene (Rexene 1017) film was also extruded for comparison. Release values are presented in Table I.

TABLE I

| Sample | 90° Peel (g/in.)[1] | |
|---|---|---|
| | Solvent acrylic adhesive | Rubber hot melt adhesive |
| Example 1 | 76 ± 11 | 261 ± 84 |
| LDPE | 223 ± 64 | Over 1000 |

[1]Each entry represents the average of five measurements, with uncertainty (±) expressed at the 95% confidence level. Peel speed was 12 in./min.

EXAMPLE 2

One percent by weight of Shell Low Surface Energy Polymer #2 was mixed with 99% by weight of Rexene 1017 low density polyethylene, using a Brabender Prep Mixer with Banbary type mixing blades rotating at 10 rpm for 10 minutes, at 160° C. The mixture was granulated and then added to the hopper of a Brabender single screw extruder having a ¾ in. screw diameter and a 25:1 length to diameter ratio. The mixture and polypropylene (Shell 5A97) were coextruded as a two-layer film using a Killion ABC feedblock and EDI 6 in. sheet and film die, at 450° F. The polyethylene-block copolymer mixture was extruded by the Brabender extruder at 10 rpm. A first charge of polypropylene was extruded by a Killion extruder (¾ in. screw diameter, 25:1 length to diameter ratio) at 9 rpm, and a second charge of polypropylene was extruded by a Killion extruder (1 in. screw diameter, 25:1 length to diameter ratio) at 22.4 rpm. The two charges of polypropylene were blended into a single melt in the feedblock. As the two-layer, coextruded film exited the die, the polyethylene-block copolymer layer was facing the air and the polypropylene layer was facing the chill roll. Take up speed was 10 feet per minute.

Release values from a solvent acrylic and a rubber hot melt adhesive were measured after an initial 20 minute dwell at room temperature, and after being aged in a 70° C. oven, for 24, 48 and 72 hours. The adhesive-coated release surface laminates were subjected to 0.5 psi of pressure in the aging oven. Release values are presented in Table II.

TABLE II

| Aging Time (hours) | 90° Peel (g/in.)[1] | |
|---|---|---|
| | Solvent acrylic adhesive | Rubber hot melt adhesive |
| 0.3 | 60.0 ± 9.0 | 199 ± 4 |
| 24 | 93.0 ± 7.0 | 405 ± 102 |
| 48 | 85.0 ± 4.7 | 390 ± 145 |
| 72 | 83.0 ± 9.0 | 374 ± 74 |

[1]See Table I, note 1.

EXAMPLE 3

A three-layer coextruded release film was prepared as follows: 1% by weight of Shell Low Surface Energy Polymer #4 (a tri-block copolymer with two polyethylene blocks of about 600 number average molecular weight each flanking a PDMS block of about 3000 number average molecular weight, made from coupling two 600–1500 molecular weight polyethylene-PDMS di-block copolymers) was mixed with 99% by weight of polyethylene (Rexene 1017) using a Brabender prep mixer with Banbary type mixing blades rotating at 10 rpm for 10 minutes, at 160° C. The mixture was granulated and then added to the hopper of a single screw extruder. The mixture, ethylene vinyl acetate copolymer (Quantum 631-04 EVA), and polypropylene (Shell 5A97) were coextruded as a 3-layer film. The polyethylene-siloxane copolymer mixture was extruded by a Brabender extruder having a ¾ in. screw diameter and a 25:1 length to diameter ratio, at 14 rpm. The ethylene vinyl acetate copolymer was extruded using a Killion extruder having a ¾ in. screw diameter and a 25:1 length to diameter ratio, at 16 rpm. The polypropylene was extruded using a Killion extruder having a 1 in. screw diameter and a 25:1 length to diameter ratio, at 47.5 rpm. The three layers were coextruded through a Killion ABC feedblock and EDI 6 in. sheet and film die, at 450° F. As the three-layer coextruded film exited the die, the polyethylene siloxane copolymer layer was facing the air and the polypropylene layer was facing the chill roll. Take up speed was 15 feet per minute. The coextruded film's release from solvent acrylic and rubber hot melt pressure sensitive adhesives was measured by TLMI 90° peel at four different test speeds, after an initial 20 minute dwell at room temperature. Release values are presented in Table III.

TABLE III

| Speed (inch/min.) | 90° Peel (g/in.)[1] | | |
|---|---|---|---|
| | Solvent acrylic adhesive | Emulsion acrylic adhesive | Rubber hot melt adhesive |
| 12 | 72.8 ± 7.9 | 105.9 ± 5 | 297 ± 31 |
| 300 | 34.5 ± 11.7 | 164 ± 7.9 | 44.9 ± 1.1 |
| 600 | 29.1 ± 9.0 | 135.8 ± 14.0 | 44.5 ± 16.7 |
| 1200 | 26.0 ± 11.6 | | 30.1 ± 3.9 |

[1]See Table I, note 1.

EXAMPLE 4

One percent by weight of a polystyrene-PDMS di-block copolymer having a polystyrene block with a number average molecular weight of about 3,000 and a PDMS block with a number average molecular weight of about 10,000 was made according to the method described by J. C. Saam, et al., in *Macromolecules*, Vol. 3, no. 1, pp. 1–4 (1970), which is incorporated herein by this reference. The block copolymer was mixed with 99% by weight of KR-05, a butadiene-modified polystyrene commercially available from Phillips 66 Company, using a Brabender prep mixer with Banbary type mixing blades rotating at 10 rpm for 10 minutes, at 160° C. The mixture was granulated and then added to the hopper of a single screw extruder. The polystyrene-siloxane copolymer mixture, polypropylene (Shell 5A97) and an anhydride-modified ethylene vinyl acetate copolymer (Bynel 361, available from DuPont) were coextruded as a 3-layer film. The polystyrene-siloxane copolymer mixture was extruded using a Brabender extruder having a ¾ in. screw diameter and a 25:1 length to diameter ratio, at 15 rpm. The ethylene vinyl acetate copolymer was extruded using a Killion extruder having a ¾ in. screw diameter at 16 rpm and 25:1 length to diameter ratio. The polypropylene was extruded using a Killion extruder having a 1 in. screw diameter and a 25:1 length to diameter ratio, at 47 rpm. The three layers were coextruded using a Killion ABC feedblock and EDI six inch sheet and film die, at 430° F. As the three-layer coextruded film exited the die, the polystyrene-siloxane copolymer mixture layer was facing the air and the polypropylene layer was facing the chill roll. Take up speed was 15 feet per minute. The film's release from solvent acrylic and rubber hot melt adhesives was measured by TLMI 90° peel. A coextruded "control" film comprising a top layer of KR-05, an intermediate layer of Bynel 361, and a bottom layer of polypropylene also was prepared, and its release values (90° peel) were measured, for comparison. The results are presented in Table IV.

TABLE IV

| Sample | 90° Peel (g/in.)[1] | |
|---|---|---|
| | Solvent acrylic adhesive | Rubber hot melt adhesive |
| Example IV | 236 ± 32 | 516 ± 180 |
| "Control" | 580.6 ± 117 | 1000+ |

[1]See Table I, note 1.

EXAMPLES 5–27

In like manner, several other extruded film release surfaces were prepared in accordance with the present invention by extruding polymeric compositions similar to those described in Examples 1–4. With the exceptions noted in Table V, in each of Examples 5–25, the block copolymer comprised a block of PDMS coupled to one or two blocks of polyethylene, and the bulk polymeric material was HDPE or LDPE. The number average molecular weight of the polyethylene block(s) in each copolymer was approximately 1000. In Examples 25 and 26, the block copolymer is comprised of a block of PDMS and a block of polystyrene. Each film's release from a solvent acrylic adhesive (Avery Dennison "I-679"), emulsion acrylic adhesive (Avery Dennison "AT-1"), and/or rubber hot melt adhesive (Avery Dennison "S-246") was evaluated using a TLMI 90° peel test. The composition of each example and the results of the peel test are presented in Table V.

TABLE V

| Example No. | No. of extruded layers[1] | Bulk Polymer[2] | Siloxane Block mw[3] | Di/ Tri Block[4] | % Copolymer present[5] | % Siloxane present[6] | 90° Peel (g/in)[7] Solvent Acrylic Adhesive | | |
|---|---|---|---|---|---|---|---|---|---|
| | | | | | | | 12"/min | 300"/min | 600"/min |
| 5 | one | HDPE[8] | 2500 | Di | 0.10 | 0.07 | 348.0 ± 54 | | |
| 6 | one | LDPE[9] | 2500 | Di | 0.10 | 0.07 | 159.0 ± 17 | | |
| 7 | one | LDPE | 2500 | Di | 0.33 | 0.24 | 104.0 ± 4 | | |
| 8 | one | LDPE | 2500 | Di | 0.50 | 0.36 | 141.0 ± 37 | | |
| 9 | one | LDPE | 2500 | Di | 1.00 | 0.71 | 81.0 ± 8 | | |
| 10 | one | LDPE | 2500 | Di | 1.00 | 0.71 | 41.2 ± 9 | 28.8 ± 4 | 20.8 ± 4 |
| 11 | one | LDPE | 2500 | Di | 3.00 | 2.14 | 53.9 ± 4 | | |
| 12 | three | LDPE | 2500 | Di | 1.00 | 0.71 | 61.0 ± 10 | | |

TABLE V-continued

| | | | | | | | 90° Peel (g/in)[7] | | |
|---|---|---|---|---|---|---|---|---|---|
| 13 | three | LDPE | 2600 | Di | 1.00 | 0.72 | 55.5 ± 8 | 24.0 ± 3 | |
| 14 | three | LDPE | 2600 | Di | 1.00 | 0.72 | 107.6 ± 30 | | |
| 15 | one | LDPE | 2600 | Di | 1.00 | 0.72 | 124.1 ± 15 | | |
| 16 | one | LDPE | 2600 | Di | 3.00 | 2.17 | 97.4 ± 3 | | |
| 17 | three | LDPE | 5200 | Tri | 1.00 | 0.84 | | | |
| 18 | three | LDPE | 5200 | Tri | 1.00 | 0.84 | 125.9 ± 44 | | |
| 19 | three | Flexomer[13] | 5200 | Tri | 1.00 | 0.84 | 79.3 ± 5 | 37.0 ± 3 | |
| 20 | one | LDPE | 6000 | Di | 1.00 | 0.86 | 79.8 ± 11 | 25.1 ± 9 | 23.4 ± 3 |
| 21 | one | LDPE | 6000 | Di | 1.00 | 0.86 | 70.3 ± 6 | 38.8 ± 4 | 31.2 ± 9 |
| 22 | one | LDPE | 6000 | Di | 3.00 | 2.57 | 34.5 ± 5 | 11.4 ± 11 | 14.0 ± 2 |
| 23 | one | LDPE | 6000 | Di | 3.00 | 2.57 | 38.3 ± 9 | | |
| 24 | one | EPR 306[14] | 6000 | Di | 1.00 | 0.86 | 17.3 ± 2 | | |
| 25 | one | KR-05[16] | 2000 | Di | 0.50 | | 718.0 ± 74 | | |
| 26 | three | KR-05 | mix[17] | Di | 1.00 | | 527.4 ± 84 | | |

| | 90° Peel (g/in)[7] | | | | | | |
|---|---|---|---|---|---|---|---|
| Example | Emulsion Acrylic Adhesive | | | Rubber Hot Melt Adhesive | | | |
| No. | 12"/min | 300"/min | 600"/min | 12"/min | 300"/min | 600"/min | Notes |
| 5 | | | | 1000 + | | | |
| 6 | | | | −1000 | | | |
| 7 | | | | 409.0 ± 195 | | | |
| 8 | | | | 750.0 ± 88 | | | |
| 9 | | | | 276.0 ± 25 | | | |
| 10 | 52.7 ± 17 | 95.1 ± 6 | 91.4 ± 10 | 203.3 ± 91 | 127.3 ± 68 | 56.6 ± 35 | Annealed[10] |
| 11 | 54.3 ± 4 | | | 159.1 ± 19 | | | |
| 12 | | | | 165.0 ± 44 | | | MDO[11] |
| 13 | | | | 126.0 ± 22 | 45.0 ± 38.82 | | |
| 14 | 124.0 ± 30 | | | 162.5 ± 31 | | | Aged 1 mo.[12] |
| 15 | 155.1 ± 22 | | | 272.8 ± 96 | | | |
| 16 | 54.8 ± 3 | | | 160.4 ± 21 | | | |
| 17 | | | | | | | MDO |
| 18 | 209.2 ± 26 | | | 223.5 ± 26 | | | Aged 1 mo. |
| 19 | | | | 1000 + | 669.6 ± 55.93 | | |
| 20 | 72.8 ± 13 | 170.9 ± 22 | 167.2 ± 15 | 155.4 ± 8 | 87.2 ± 28 | 56.0 ± 74 | |
| 21 | 45.0 ± 13 | 125.8 ± 10 | 149.5 ± 19 | 152.4 ± 31 | 49.5 ± 4 | 39.8 ± 3 | Annealed |
| 22 | 13.3 ± 7 | 67.7 ± 5 | 96.3 ± 6 | 99.4 ± 50 | 12.9 ± 7 | 12.9 ± 10 | |
| 23 | 15.7 ± 7 | | | 128.8 ± 57 | | | Annealed |
| 24 | 100.7 ± 16 | | | Welds[15] | | | |
| 25 | | | | 1000 + | | | |
| 26 | | | | 1000 + | | | |

NOTES TO TABLE V

[1]Each example comprised either a single layer extruded film of block copolymer and bulk polymeric material, or a three layer extrudate comprising a "top" layer of block copolymer and bulk polymer, an intermediate "tie" layer of Bynel 361 (an anhydride-modified ethylene-vinyl acetate copolymer, available from DuPont), and a "bottom" layer of polypropylene.
[2]Each entry identifies the bulk polymeric material with which the siloxane block copolymer was mixed and extruded.
[3]Each entry represents the target molecular weight of the siloxane (PDMS) block of the block copolymer.
[4]Each siloxane block copolymer was either a di-block ("Di") or tri-block ("Tri") copolymer.
[5]Each entry indicates the percentage by weight of siloxane block copolymer present in the bulk polymeric material - block copolymer mixture, based on the total weight of the mixture.
[6]Each entry indicates the percentage by weight of PDMS present in the bulk polymer - block copolymer mixture, based on the total weight of the mixture.
[7]90° peel was measured at speeds of 12"/min., 300"/min., and/or 600"/min. Each entry represents the average of five measurements, with uncertainty (±) expressed at the 95% confidence level.
[8]"Alathon" M6030 high density polyethylene, sold by Occidental Chemical Corp..
[9]Rexene "1017" low density polyethylene, sold by Rexene.
[10]Before being coated with adhesive, the extruded film was annealed for 15 minutes, in the presence of air, in an oven set at 90° C.
[11]Before being coated with adhesive, the extruded film was machine direction oriented (MDO).
[12]The extruded film was coated with adhesive, then aged for 1 month at room temperature prior to the 90° peel test.
[13]"Flexomer" denotes an ultra-low density polyethylene identified as PEFD-9078 NT-7, sold by Union Carbide.
[14]"EPR 306" is an ethylene-propylene rubber, sold by Miles, Inc.
[15]"welds" indicates that the release surface and adhesive permanently adhered to each other.
[16]"KR-05" is a polystyrene containing a small amount of butadiene copolymerized therewith, sold by Phillips Chemical Co.
[17]"mix" indicates that the siloxane block copolymer was a blend of equal amount of three polystyrene ("PS") - PDMS block copolymers, having number average molecular weights of about PS 8,400; PDMS 16,300; PS 13,900; PDMS 16,400; and PS 4,800; PDMS 5,000, respectively.

Silicone Transfer Tests

Although silicone-coated release liners serve a very important purpose in the label and tape industry, they also can have a deleterious effect on the performance of the pressure sensitive adhesives with which they are employed, due to silicone transfer from the release liner to the adhesive. In particular, it is known that when a pressure-sensitive adhesive tape or label is peeled away from its silicone-coated release liner, some of the silicone is transferred to the pressure sensitive adhesive, rendering the adhesive at least slightly less tacky. In order to examine, quantitatively, the extent, if any, to which the release surfaces of the present invention exhibit a similar behavior, tests were conducted to measure the reduction in adhesive performance of a commercially available tape applied to the release surfaces prepared in Examples 2–4.

Tape-plus-liner constructions were made using 3M "810" tape (a self-wound pressure sensitive adhesive tape having an acrylic adhesive) and the release surfaces prepared as in Examples 2–4. Five samples of each construction were tested. In each case, a tape-plus-liner construction was aged for 20 hours in an oven at 70° C., under 0.5 psi of pressure. After aging, the tape was removed from the liner and adhered to a stainless steel panel. The tape's adhesion to the panel was measured using a TLMI 90° peel test. A control sample of unaged 3M 810 tape also was adhered to a stainless steel panel, and its adhesion measured using a 90° peel test. The results are given in Table VI.

TABLE VI

| Sample | 90° Peel (g/in.)[1] |
|---|---|
| 810 Tape on Ex. 2 | 206.7 ± 12.2 |
| 810 Tape on Ex. 3 | 136.6 ± 10.5 |
| 810 Tape on Ex. 4 | 157.6 ± 14.1 |
| 810 Tape (Control) | 281.5 ± 11.4 |

[1]See Table I, note 1.

What is claimed is:

1. A release surface for a pressure sensitive adhesive construction, comprising:
   a pressure-sensitive adhesive-releasable polymeric film comprising an extruded mixture of a first polymeric material and a block copolymer, wherein a first block of the copolymer is compatible with said first polymeric material, and a second block of the copolymer is a polysiloxane.

2. A release surface as recited in claim 1, wherein the block copolymer is a di-block copolymer.

3. A release surface as recited in claim 1, wherein the block copolymer is a tri-block copolymer.

4. A release surface as recited in claim 1, wherein the block copolymer is a star-block copolymer.

5. A release surface as recited in claim 1, wherein the first polymeric material is selected from the group consisting of polyolefins, olefin copolymers, polyesters, nylons, styrene polymers, and blends thereof.

6. A release surface as recited in claim 1, wherein the first polymeric material comprises a polyolefin.

7. A release surface as recited in claim 6, wherein the polyolefin is selected from the group consisting of polyethylene, polypropylene, polybutene, polymethylpentene, olefin-olefin copolymers, and blends thereof.

8. A release surface as recited in claim 1, wherein the polysiloxane is polydimethylsiloxane.

9. A release surface as recited in claim 1, wherein the second block of the copolymer has a number average molecular weight of about 1000 or more.

10. A release surface as recited in claim 1, wherein the block copolymer is present in an amount of from about 0.1 to 10% by weight, based on the combined weight of the first polymeric material and the block copolymer.

11. A release surface as recited in claim 1, wherein the block copolymer is present in an amount of from about 0.5 to 3% by weight, based on the combined weight of the first polymeric material and the block copolymer.

12. A release surface for a pressure sensitive adhesive, comprising:
    a pressure-sensitive adhesive-releasable polymeric film comprising an extruded mixture of (a) from about 90 to 99.9% by weight polyolefin, and (b) from about 0.1 to about 10% by weight block copolymer, wherein a first block of the copolymer is compatible with the polyolefin, and a second block of the copolymer is polydimethylsiloxane.

13. A release surface as recited in claim 12, wherein the first block of the copolymer is polyethylene.

14. A release surface as recited in claim 13, wherein the first block has a number average molecular weight of about 1000.

15. A release surface as recited in claim 12, wherein the second block has a number average molecular weight greater than or equal to about 2500.

16. A release surface as recited in claim 12, wherein the block copolymer is a di-block copolymer.

17. A release surface as recited in claim 12, wherein the block copolymer is a tri-block copolymer.

18. A release surface as recited in claim 17, wherein the third block of the block copolymer is compatible with the polyolefin.

19. A release surface as recited in claim 18, wherein the first and third blocks of the copolymer are polyethylene.

20. A release surface as recited in claim 19, wherein the first and third blocks each have a number average molecular weight of about 1000.

21. A release surface as recited in claim 12, wherein the block copolymer is a star-block copolymer.

22. A coextruded release surface for a pressure sensitive adhesive construction, comprising:
    a first extruded layer of a mixture of a first polymeric material and a block copolymer, wherein a first block of the copolymer is compatible with the first polymeric material, and a second block of the copolymer is a polysiloxane; and
    at least one additional extruded layer of polymeric material.

23. A coextruded release surface as recited in claim 22, wherein each of said at least one additional extruded layer of polymeric material is, independently, the same as or different from the first polymeric material of the first extruded layer.

24. A coextruded release surface as recited in claim 22, wherein the first polymeric material and each of said at least one additional extruded layer of polymeric material are independently selected from the group consisting of polyolefins, olefin copolymers, polyesters, nylons, styrene polymers, and blends thereof.

25. A coextruded release surface as recited in claim 22, wherein the block copolymer is a di-block, tri-block, or star-block copolymer.

26. A coextruded release surface as recited in claim 22, wherein the block copolymer is present in an amount of from about 0.1 to 10% by weight, based on the combined weight of the first polymeric material and the block copolymer.

27. A coextruded release surface as recited in claim 22, wherein the block copolymer is present in an amount of from about 0.5 to 3% by weight, based on the combined weight of the first polymeric material and the block copolymer.

28. A release surface as recited in claim 22, comprising:
    a first extruded layer of a mixture of polyethylene and a polyethylene-polydimethylsiloxane block copolymer;
    a second extruded layer of polypropylene; and
    a third extruded layer of an ethylene vinyl acetate polymer, sandwiched in between the first and second layers.

29. A release surface as recited in claim 28, wherein the ethylene vinyl acetate polymer is anhydride-modified.

30. A release surface for a pressure sensitive adhesive construction, comprising:

an extruded mixture of a first polymeric material and a tri-block copolymer having the formula ABA, where A is a polymeric block compatible with the first polymeric material, and B is a polysiloxane.

31. A release surface as recited in claim 30, wherein the first polymeric material is selected from the group consisting of polyolefins, olefin copolymers, polyesters, nylons, styrene polymers, and blends thereof.

32. A release surface as recited in claim 30, wherein the first polymeric material is a polyolefin selected from the group consisting of a polyethylene, polypropylene, polybutene, polymethylpentene, olefin-olefin copolymers, and blends thereof.

33. A release surface as recited in claim 30, wherein the first polymeric material is polyethylene and the tri-block copolymer is a polyethylene-polydimethylsiloxane-polyethylene block copolymer.

34. A release surface as recited in claim 30, further comprising at least one additional layer of polymeric material, co-extruded with said extruded mixture.

35. A release surface as recited in claim 34, wherein the first polymeric material and each of said at least one additional layer of polymeric material are independently selected from the group consisting of polyolefins, olefin copolymers, polyesters, nylons, styrene polymers, and blends thereof.

36. A tape, comprising:

a flexible backing member;

a pressure sensitive adhesive adhered to at least a portion of a first surface of the backing member; and a release surface as recited in any one of claims 1–35, adhered to or integral with at least a portion of a second surface of the backing member.

37. A pressure sensitive adhesive label construction, comprising:

a face stock;

a layer of pressure sensitive adhesive adhered to at least a portion of a first surface of the face stock; and a release surface as recited in any one of claims 1–35, releasably adhered to the pressure sensitive adhesive.

38. A method for making a release surface for a pressure sensitive adhesive, comprising:

extruding a mixture of a first polymeric material and a block copolymer, wherein a first block of the copolymer is compatible with said first polymeric material, and a second block of the copolymer is a polysiloxane.

39. A method for making a release surface for a pressure sensitive adhesive, comprising:

coextruding (a) a first layer of a mixture of a first polymeric material and a block copolymer, wherein a first block of the copolymer is compatible with said first polymeric material, and a second block of the copolymer is a polysiloxane, and (b) at least one additional layer of polymeric material.

* * * * *